April 28, 1942. E. M. LOOKABAUGH Re. 22,084

FOOTBALL SHOULDER PAD

Original Filed July 31, 1939

INVENTOR;
EDWIN M. LOOKABAUGH
BY Mella L. Church
ATTORNEY

Reissued Apr. 28, 1942

Re. 22,084

UNITED STATES PATENT OFFICE 22,084

FOOTBALL SHOULDER PAD

Edwin M. Lookabaugh, Stillwater, Okla.

Original No. 2,251,018, dated July 29, 1941, Serial No. 287,585, July 31, 1939. Application for reissue September 2, 1941, Serial No. 409,320

9 Claims. (Cl. 2—2)

My invention relates to football shoulder pads for giving protection to the chest, shoulders and back of person participating in the hazardous game of football.

One object of my invention is to provide a shoulder pad for football players, that is equipped with hinged shoulder flaps or epaulets, that are free to swing upwardly so as to not hamper upward movement of the user's arms in catching punts, making passes, etc., and which will not be shifted or moved laterally into an inefficient position, i. e., a position such as to uncover or expose portions of the user's body which said flaps are designed to protect, when they are subjected to shocks, blows or thrusts in the normal use of the apparatus, particularly in blocking.

Another object of my invention is to provide a shoulder pad of the kind above referred to, that is equipped with a novel means for absorbing or cushioning shocks and blows exerted on the hinged shoulder flaps in a direction tending to cause said flaps to exert undue downward pressure on the user's shoulders, or on portions of the apparatus which said hinged flaps overlap. Other objects of my invention are to provide a football shoulder pad which consists of but few sturdy parts, can be slipped over the head and immediately adjusted to the body; which cannot easily get out of order and is efficient for the purpose for which it is intended; to provide a shoulder pad having the salient features of durability, light weight, greater strength and more protection than now extant; a device having heavy gauge fibre chest, shoulder and back body pads, securely stitched or otherwise secured to cushion rubber padding encased in airplane cloth, said padding being double thickness over the top of the shoulders and re-inforced with spring steel; to provide a hinge connection at the back of said body pads, lacing for the front and bellows style leather binding at the neck thereof; to provide moulded and corrugated turtle-back design, fibre shoulder caps, stitched or otherwise secured to cushion rubber padding encased in airplane cloth with extra pads in the centers and roll-padded around the edges, said caps being attached to the outer edges of the shoulder arch of its body pads by double edge leather hinges; to provide dual fibre cantilever shoulder flaps or epaulets, spring steel re-inforced, humped, and corrugated, padded and lined with rubber and airplane cloth, hinged over the inner edge of the shoulder arches with triple leather hinges; to provide web snubber shock absorbers spaced from said hinges on both sides toward the front and back for joining the epaulets to the body pads; also adjustable elastic body straps for positioning under the arms.

To this end I have devised a shoulder pad for football players, that is composed of a body protecting portion of any preferred construction, adapted to be mounted on and secured in operative position on the body of the user, upwardly swinging, hinged shoulder flaps or so-called epaulets, of any suitable or preferred construction, carried by said body portion and arranged so as to protect the user's shoulders, and a means that prevents said shoulder flaps from moving or shifting laterally into an inefficient or improper position, without, however, interfering with the free, upward swinging movement of said shoulder pads. In addition to being prevented from skewing around, or shifting laterally or sidewise into a position such as to expose portions of the user's body, which they are designed to protect, the hinged shoulder flaps are held against movement in a direction that result in said flaps exerting undue pressure on the points of the user's shoulders or on portions of the apparatus overlapped by said flaps, when said flaps are subjected to downward shocks or blows. The co-acting parts of the apparatus above referred to may be constructed and combined in various ways without departing from the spirit of my invention, but I prefer to absorb or cushion the downward blows on the hinged shoulder flaps, by means of snubbers or shock absorbers, that also prevent lateral shifting or skewing of said flaps. One or a plurality of such snubbers, or holding devices may be combined with each hinged shoulder flap to prevent skewing or lateral shifting of same, and while the preferred form of my invention herein illustrated and described comprises snubbers arranged at both the front and back ends of the hinged shoulder flaps or epaulets of the apparatus, I wish it to be understood that my broad idea contemplates a football shoulder pad provided with a hinged shoulder flap, and a single means or device located at only one end of said flap, to hold it against skewing or lateral movement in a direction that would result in uncovering or exposing a portion of the user's body that is intended to be protected by said flap. In a construction of the kind just referred to the single holding device, snubber or equivalent means associated with each hinged shoulder flap would be arranged at the front end of the shoulder flap, and would be constructed or disposed so that the shocks or blows which the front end portion of the shoulder flap would be subjected to in blocking, would not cause said flap to move laterally or inwardly towards the center line of the user's body.

I have herein illustrated my invention embodied in a football shoulder pad of the type or kind in which hinged shoulder caps are attached to the body protecting portion of the apparatus in such a way as to lie underneath or be partially overlapped by the hinged shoulder flaps previously described, I wish it to be understood, however, that such hinged shoulder caps are not essential and may be omitted, without departing from the spirit of my invention. Obviously, in such a construction not equipped with hinged shoulder caps, the hinged shoulder flaps of the apparatus would be proportioned or designed so as to afford protection to the user's shoulder points.

While my broad idea contemplates the use of various types and kinds of snubbers, shock absorbers or anti-skewing devices for maintaining the hinged shoulder flaps in the position they are intended to occupy, I prefer to use snubbers of the particular construction herein disclosed, inasmuch as they perform a dual function, and they are strong, inexpensive and easy to combine with the hinged shoulder flaps and the body protecting portion of the apparatus. Each snubber consists of or comprises a non-stretchable, inelastic, pliable strip of substantially S-shape, having one of its ends attached to the body protecting portion of the apparatus and its other end attached to the hinged shoulder flap, and arranged so that a part of said strip lies between superimposed parts of said flap and body protecting portion with, and rigid or stiff elements or parts on said flap and body protecting portion project in opposite directions into the oppositely-disposed loops of said S-shaped strip and normally bear against the closed ends of said loops. In most instances the stiff or rigid elements or parts just mentioned will be formed from pieces of hard fibre that constitute parts of the hinged shoulder flaps and the body protecting portion of the apparatus. The S-shaped strip will usually be formed from a piece of fabric webbing. This type of connection between the hinged shoulder flap and the body protecting portion of the apparatus permits said flap to move freely into a vertical or upright position, notwithstanding the fact that during such movement of the flap, the end part of the flap to which the S-shaped strip is attached, travels or moves a considerably greater distance relatively to the body protecting portion of the apparatus, then the center portion of the flap where the hinge of the flap is located. This, of course, is made possible by the loop form of the connecting device. When the hinged shoulder flap swings downwardly back to its former position, the rigid or stiff elements on said flap and on the body protecting portion of the apparatus that are positioned in the loops of the S-shaped strip, exert pressure on the enclosed ends of said loops, and thus place the strip under sufficient tension to maintain the flap in its normal position which is substantially horizontal or tilted upwardly slightly at its outer end. Consequently, a downward force or blow exerted on the hinged shoulder flap will be absorbed or cushioned by the co-action of the said stiff or rigid elements on the flap and body protecting portion, with the closed ends of the loops of the S-shaped strip, such a downward force or blow, tending to cause the outer end of the flap to rock downwardly, and thus placing the strip under greater tension. The said strip is made of such length, and the coacting stiff or rigid elements are so arranged that while the flap is capable of a slight downward movement, it cannot move downwardly far enough, even under an abnormal downward shock or blow, to cause the full force of the blow to be transmitted directly to the user's shoulder. Hence, the snubber limits and restricts the downward movement of the hinged shoulder flap and prevents said flap from exerting undue pressure on the user's shoulder, or on a part of the apparatus, such as a shoulder cap, positioned underneath the hinged shoulder flap. Similarly, a lateral thrust or blow on the front end portion of the hinged shoulder flap, tending to twist said flap or move it inwardly or laterally toward the body protecting portion of the apparatus, is resisted or counteracted by the increased tension of the strip, produced by the conjoint action of the stiff or rigid element on the body protecting portion which bears against the closed end of the bottom loop of the S-shaped strip, and the stiff or rigid element on the hinged shoulder flap that bears against the closed end of the top loop of said strip.

Like characters of reference designate like parts in all the figures.

Figure 1:
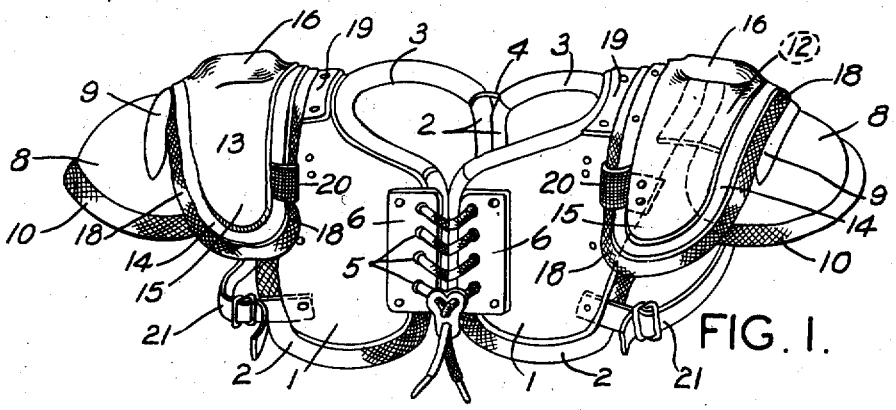
Figure 1 is a perspective view of my football shoulder pad.

It is understood that various changes in the form, proportion, size, shape, weight and other details of construction, within the scope of my invention may be resorted to without departing from the spirit or broad principle of my invention and without sacrificing any of the advantages thereof, and it is further understood that the drawing is to be interpreted as being illustrative and not restrictive.

One preferred embodiment of my invention is shown as follows: Body members 1 are made right and left, protect the chest, arch over the shoulders and down the back. The said members 1 are made of heavy gauge fibre, lined on the inner faces with cushion rubber padding encased in airplane cloth, this padding 2 extending beyond the edges of said members 1 around the entire periphery thereof. The collar edges at the neck have bellows-style soft suede leather binding. This padding and binding may be secured to members 1 by stitching or any other suitable means. The right and left body members have leather hinge connection 4 at the back and lacing 5 at the front. The perforated lacing edging 6 may be riveted and stitched to members 1. The cushion rubber padding 7 over top of shoulder has double the thickness of the padding used at the front and back.

The moulded shoulder caps 8 are of turtle-back design and have stiffening corrugations 9. The said caps 8 are lined with cushion rubber padding 10 encased in airplane cloth, extending beyond the edges thereof, the said padding being double thickness at the center 11 and roll-padded under the edges 10. The caps 8 are secured to the outer edges of the shoulder arches of body members 1 by double edge leather hinges 12 by rivets or any other suitable means.

Figure 2:
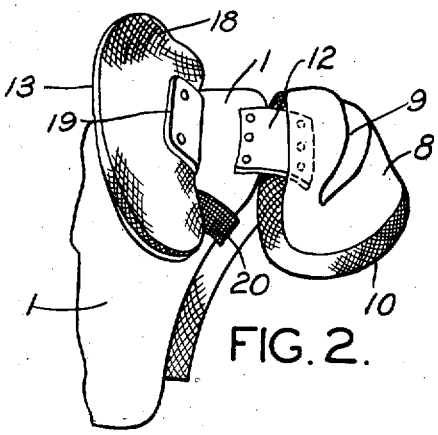
Figure 2 is a fragmentary perspective view, showing the shoulder cap in natural position, the cantilever epaulet being folded back.
Figure 4:
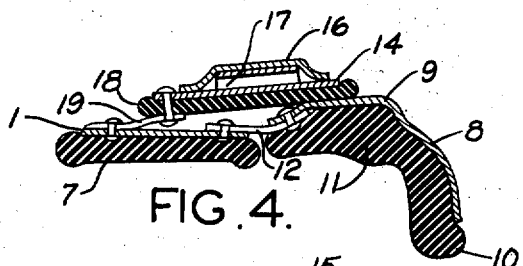
Figure 4 is a section on the line 4—4 of Figure 3.
Figure 5:
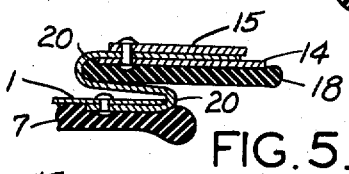
Figure 5 is a section on the line 5—5 of Figure 3.
Figure 3:
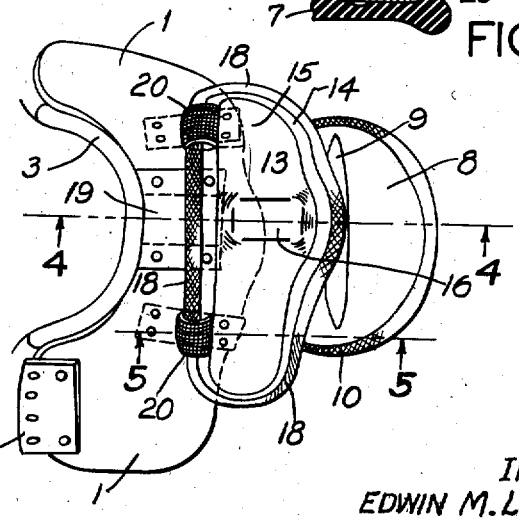
Figure 3 is a fragmentary plan view of the pad.

My dual fibre cantilever shoulder flaps or epaulets 13 have base fibres 14 and top fibres 15, the latter being formed with transverse humps 16 near their centers. Between said fibres 14 and 15 I provide longitudinal spring steel reinforcing 17 which conforms to the inner contours of the said humps 16. Epaulets 13 have similar but thinner cushion rubber or felt paddings 18 encased in airplane cloth, as used for lining the members 1 and caps 8, but the said paddings extend only slightly beyond the edges of the said epaulets. Triple leather hinges 19 secure the epaulets 13 to the inner edges of the shoulder arches of body members 1, thus the said cantilevered epaulets 13 ride the body members 1 and extend out over the shoulder caps 8, the outer edges of said epaulets 13 resting over the corrugations 9 of caps 8. I provide web snubber shock absorbers 20 on both sides of hinges 19 at the front and back of the cantilever epaulets 13. The said snubbers 20 serve as balanced fulcrums for the cantilevered epaulets 13 being anchored at hinge 19. The outer ends of said snubbers are secured between the base fibres 14 and top fibres 15, fold over the inner edges of epaulets 13, swing back like a letter S and have their inner ends secured under the outer edges of body members 1 as can best be seen in Figure 5. The said snubbers 20 permit movement of epaulets 13 as seen in Figure 2, but prevent lateral displacement from blows striking the outer, exposed edges. The said snubbers 20 also provide added stability to the cantilever, re-inforce the hinge 19 and protect the epaulet 13 from being torn loose. It will thus be seen that in my improved apparatus, the snubbing devices prevent the epaulets 13 from shifting laterally or sidewise into an inefficient position, they normally hold said epaulets in a substantially horizontal or slightly upwardly tilted position, and when the epaulets are subjected to violent downward shocks or blows, the tension of the flexible strips 20 of the snubbing devices is automatically increased to such an extent or degree, that such blows are absorbed and the downward movement of the epaulets arrested before said epaulets can move downwardly far enough to cause injury or extreme discomfiture to the user's shoulders. Moreover, the highly desirable results above mentioned are attained without interfering with or restricting the free upward swinging movement of the epaulets when the user is catching punts or making passes.

As can best be seen in Figure 1, adjustable elastic body straps 21 attached to the lower outer edges of the body members 1 are adapted for positioning under the arms to prevent the shoulder pads from slipping off over the head.

Football coaches who have developed winning teams appreciate the vital necessity of securing equipment that protects the athlete, gives him comfort and allows freedom of action without sacrificing speed. Injuries may result in the loss of a good player when most needed as well as suffering, expense and perhaps permanent handicap. While other parts of the body are subject to impairment, the shoulders receive many hard blows as they take the brunt of tackling, blocking, running interference, holding the line and similar plays. A blow on the point of the shoulder may cause dislocation. A downward blow may snap the clavicle or collar bone. A blow on the chest may break a rib. The purpose of my invention is to obviate all of this by protecting these vulnerable points. My body members 1 protect the chest and back. My moulded and cushioned shoulder cap 8 preserves the safety of the shoulder joint, and my cantilevered epaulet 13 rides the other two and guards the clavicle against breakage, all of which is self-evident from the foregoing specification.

Having thus described my invention, what I claim as new and desire to secure by Letters Patent is:

1. In a football shoulder pad, the combination with laced body members, hinged shoulder caps and arched cantilevered epaulets, of hinged means for securing the central section of the said epaulets to the inner edges of the body members and two web snubber shock absorbers for securing the said epaulets to the outer edges of the body members at both the front and back of said epaulets, the said central hinge and snubbers forming a three-point support for the said epaulets against displacement, substantially as described.

2. In a football shoulder pad, the combination with hinged and laced body members to be secured around the chest of the wearer and hinged shoulder caps, of arched re-inforced padded cantilevered epaulets centrally hinged to the inner edges of the body members and having S-shaped limiting snubber straps for anchoring the inner edges of the said epaulets against the outer edges of the body members, the said hinge and snubbers forming a three-point support against displacement of the said epaulets.

3. A football shoulder pad, comprising a body protecting portion, shoulder flaps carried by said portion, hinge connections between said body protecting portion and flaps, located approximately midway the ends of said flaps, an elastic, non-stretchable, flexible strip attached to one end portion of each of said shoulder flaps and to the said body protecting portion, and means co-acting with strips for causing said strips to limit downward movement of said shoulder flaps relatively to said body protecting portion and to effectively prevent said flaps from skewing around or shifting inwardly towards said body protecting portion, into an improper position.

4. A football shoulder pad provided with a body member, a shoulder flap connected intermediate its ends by a hinge to said body member, said flap being arranged in overlapping relationship with said body member, a flexible strip attached to one end of said flap and to said body member and folded so as to produce loops that comprise a portion which lies between said parts, and devices on said flap and body member that co-operate with said strip to absorb downward shocks or blows on said flap and to prevent said flap from skewing around.

5. In an athletic protecting apparatus, the combination of two parts, a hinge for joining said parts together, and a connection between said parts located at a point remote from said hinge, composed of a substantially S-shaped, flexible strip, and stiff or rigid elements attached to said parts and positioned in the looped portions of said strip for holding said strip in tension under certain conditions.

6. A football shoulder pad provided with a body protecting portion, a shoulder flap, a hinge connection between said flap and body portion located intermediate the front and rear ends of said flap, and a means connected to said body protecting portion and to one end portion of said flap for effectively holding said flap against lateral or sidewise movement towards said body protecting portion, said means being separate and distinct from said hinge connection and being constructed so as to not resist upward swinging movement of said flap relatively to said body protecting portion.

7. A football shoulder pad provided with a body protecting portion, a shoulder flap, a hinge connection between said flap and body protecting portion located at approximately the center portion of said flap, and a means combined with said flap and body protecting portion and located at one end portion of said flap, for restricting downward movement of said flap relatively to said body protecting portion, whereby downward shocks or blows on said flap will be absorbed and said flap prevented from exerting undue pressure on the user's shoulder, said means being separate and distinct from said hinge connection.

8. A football shoulder pad provided with a body protecting portion, a shoulder flap, a hinge connection between said flap and body protecting portion located at approximately the intermediate portion of said flap, and a means combined with said flap and body protecting portion and located at one end portion of said flap for effectively holding said flap against lateral or sidewise movement towards said body protecting portion and for limiting downward movement of said flap relatively to said body protecting portion, whereby shocks or blows on said flap will be absorbed and said flap maintained in a proper position, said means being separate and distinct from said hinge connection.

9. A football shoulder pad provided with a body protecting portion, shoulder flaps, hinges for joining said flaps to said body protecting portion located at the inner edges of said flaps intermediate the front and rear ends of same, and snubbing devices connected to said body protecting portion and to the front and rear end portions of said flaps, and having provision for restricting downward movement of said flaps relatively to said body protecting portion and for preventing the flaps from skewing around or shifting inwardly towards said body protecting portion sufficiently to uncover or expose portions of the user's body which said flaps are designed to protect.

EDWIN M. LOOKABAUGH.